US008340280B2

(12) United States Patent
Gueron et al.

(10) Patent No.: US 8,340,280 B2
(45) Date of Patent: Dec. 25, 2012

(54) USING A SINGLE INSTRUCTION MULTIPLE DATA (SIMD) INSTRUCTION TO SPEED UP GALOIS COUNTER MODE (GCM) COMPUTATIONS

(75) Inventors: Shay Gueron, Haifa (IL); Michael Kounavis, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1205 days.

(21) Appl. No.: 12/157,961

(22) Filed: Jun. 13, 2008

(65) Prior Publication Data
US 2009/0310775 A1 Dec. 17, 2009

(51) Int. Cl.
*H04L 29/06* (2006.01)
(52) U.S. Cl. .......................................... 380/28; 380/255
(58) Field of Classification Search ...................... 380/28
See application file for complete search history.

(56) References Cited

U.S. PATENT DOCUMENTS
2007/0106896 A1* 5/2007 Sandberg et al. ............. 713/170

OTHER PUBLICATIONS

Haibin Shen; Yier Jin; Rongquan You; "Unbalanced Exponent Modular Reduction over Binary Field and Its Implementation," Innovative Computing, Information and Control, 2006. ICICIC '06. First International Conference on , vol. 1, no., Aug. 30, 2006-Sep. 1, 2006.*
Raghav Bhaskar , Pradeep K. Dubey , Vijay Kumar , Atri Rudra, Efficient galois field arithmetic on SIMD architectures, Proceedings of the fifteenth annual ACM symposium on Parallel algorithms and architectures, Jun. 7-9, 2003, San Diego, California, USA.*
Shay Gueron, et al., "Carry-Less Multiplication and Its Usage for Computing the GCM Mode," Apr. 2008, pp. 1-24.
Brian Gladman, "AES and Combined Encryption/Authentication Modes," 2006, pp. 1-3, http://fp.gladman.plus.com/AES/.
U.S. Appl. No. 11/772,150, filed Jun. 30, 2007, entitled "Speeding Up Galois Counter Mode (GCM) Computations," by Shay Gueron, et al.
U.S. Appl. No. 11/648,434, filed Dec. 28, 2006, entitled "Architecture and Instruction set for Implementing Advanced Encryption Standard (AES)," by Shay Gueron, et al.
U.S. Appl. No. 11/966,658, filed Dec. 28, 2007, entitled "Method and Apparatus for Efficiently Implementing the Advanced Encryption Standard," by Michael E. Kounavis, et al.
U.S. Appl. No. 11/729,199, filed Mar. 28, 2007, entitled "Flexible Architecture and Instruction for Advanced Encryption Standard (AES)," by Shay Gueron, et al.
U.S. Appl. No. 11/724,005, filed Mar. 14, 2007, entitled "Performing AES Encryption or Decryption in Multiple Modes with a Single Instruction," by Martin Dixon, et al.

* cited by examiner

*Primary Examiner* — Edward Zee
*Assistant Examiner* — Yogesh Paliwal
(74) *Attorney, Agent, or Firm* — Trop, Pruner & Hu, P.C.

(57) ABSTRACT

In one embodiment, an encryption operation may be performed by obtaining a product of a carry-less multiplication using multiple single instruction multiple data (SIMD) multiplication instructions each to execute on part of first and second operands responsive to an immediate datum associated with the corresponding instruction, and reducing the product modulo g to form a message authentication code of a block cipher mode. Other embodiments are described and claimed.

16 Claims, 5 Drawing Sheets

USING A SINGLE INSTRUCTION MULTIPLE DATA (SIMD) INSTRUCTION TO SPEED UP GALOIS COUNTER MODE (GCM) COMPUTATIONS

BACKGROUND

In cryptography, a block cipher may be a symmetric key cipher which operates on fixed-length groups of bits referred to as "blocks." For example, during encryption, a block cipher may take a 128-bit block of plaintext as input and output a corresponding 128-bit block of ciphertext in accordance with a secret key. For decryption, the 128-bit block of ciphertext and the secret key may be used to determine the original 128-bit block of plaintext.

Galois Counter Mode (GCM) is a mode of operation for symmetric key cryptographic block ciphers. Generally, GCM is defined for block ciphers with a block size of 128 bits. GCM may involve two operations. First, the output of a block cipher may be multiplied by a hash key in a finite field. Second, the multiplication result may be reduced in size.

One current software-based GCM technique may utilize table lookups. However, building and storing of the tables may be time-consuming and resource intensive. For example, the tables may not readily fit into a level 1 (L1) cache of a processor and may require access to memory off chip, which in turn introduces latency. Other approaches may utilize a hardware-based technique, for example, found in cryptographic processors, which perform the reduction using a tree of exclusive-OR (XOR) gates specific to the polynomial of the finite field. This approach is field specific and cost-prohibitive for some implementations.

Accordingly, current techniques for performing computations associated with GCM may be time-consuming and/or cost-prohibitive.

DETAILED DESCRIPTION

In various embodiments, Galois Counter Mode (GCM) computations for block ciphers may be efficiently processed. For example, a single general-purpose processor core such as of a multi-core processor (e.g., based on Core Microarchitecture of Intel® Corporation) may be used to support high speed networking. In one embodiment, carry-less multiplications operations may be combined with fast reduction to speed up GCM computations. In an embodiment, an instruction (e.g., "PCLMULQDQ" in accordance with at least one instruction set architecture) may cause computation of a carry-less multiplication of two 64-bit operands. This instruction may be a single instruction multiple data (SIMD) instruction to be performed in a vector domain (such as a streaming SIMD extensions (SSE) domain of a processor, such that SSE-integer (i.e., vector-scalar) movement of data can be avoided. Note as used herein, the terms "vector" and "SIMD" are used interchangeably to describe multiple data elements that are acted upon by a single instruction. In an embodiment, a processor executing the instruction (such as the processor of FIGS. 4-5) may include one or more of: a memory (e.g., a level 1, level 2, last level cache, etc.) to store the instructions; a fetch unit to fetch the instructions from the memory; a decode unit to optionally decode the fetched instructions; a scheduler unit to schedule the instructions (or corresponding micro-operations (uops)) for execution; and one or more execution units to execute the instructions (or corresponding uops).

As described above, GCM is a recently recommended mode of operation for block ciphers, used for confidentiality and authentication. In particular, the Advanced Encryption Standard (AES) Galois Counter Mode (AES-GCM) has become an increasingly prominent mode used for packet processing in fast networking. GCM is typically implemented by taking a 128 bit output of a block cipher and multiplying it in Galois Field (GF) of $2^{128}$ by a hash key, which is constant during the session. Multiplication in GF ($2^{128}$) includes two phases: (i) carry-less multiplication of the two 128-bit operands, to generate a 256-bit result; and (ii) reduction modulo the irreducible polynomial $g(x)=x^{128}+x^7+x^2+x+1$. The polynomial "g" is called a "pentanomial" because it may be represented as a 128-bit string with only 5 bits equal 1. In one embodiment, a carry-less multiplication may be performed using the PCLMULQDQ instruction discussed herein as a building block to obtain the carry-less multiplication of two 128-bit inputs for GCM to obtain a 256 bit carry-less product. Furthermore, an embodiment reduces the 256-bit result modulo the pentanomial g of the finite field, e.g., to improve the overall performance.

Figure 1:
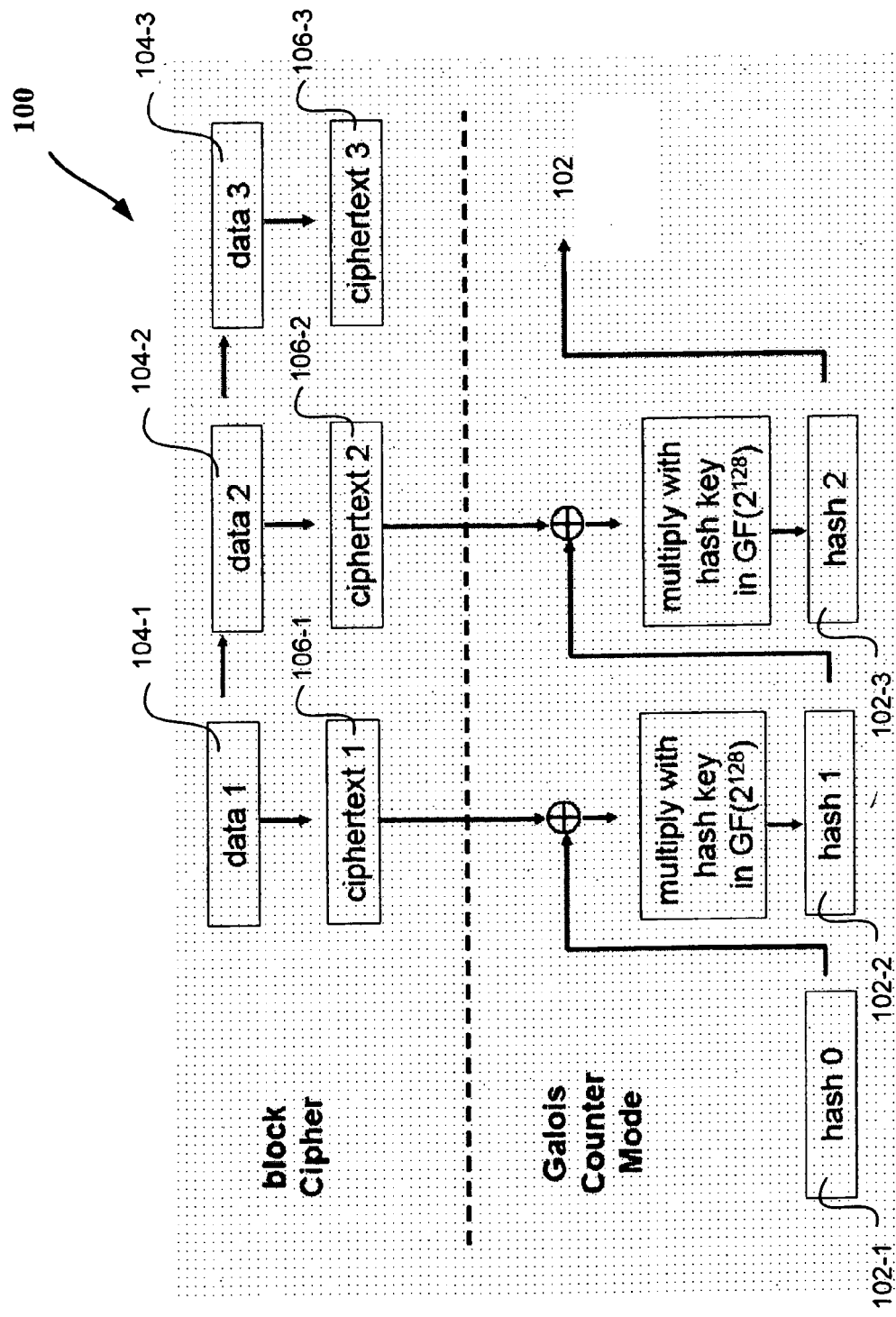
FIG. 1 illustrates an embodiment of a Galois Counter Mode (GCM), which may be utilized in accordance with some embodiments.

In particular, FIG. 1 illustrates an embodiment of a Galois Counter Mode (GCM) 100, which may be utilized in accordance with some embodiments. As shown, the mode may produce a message digest 102, called a "Galois Hash", from the encrypted data generated by a block cipher, e.g., data 104-1 through 104-3 may be encrypted based on a key to generate ciphertext 106-1 through 106-3, respectively. This Galois Hash is used for high performance message authentication. In each operation of the mode, the previous value of the Galois Hash is XOR-ed with the current ciphertext block (e.g., 106-1 is exclusive-ORed (XOR-ed) with 102-1, 106-2 is XOR-ed with 102-2, etc.). The result is then multiplied in GF ($2^{128}$) with a hash key value, where the GF ($2^{128}$) finite field is defined by the irreducible polynomial $g=g(x)=x^{128}+x^7+x^2+x+1$. Consequently, the multiplication in GF ($2^{128}$) involves carry-less multiplication of the two 128-bit operands, to generate a 256 bit result and reduction modulo the irreducible polynomial g, mentioned earlier.

Carry-less multiplication, also known as Galois Field multiplication is the operation of multiplying two numbers without generating or propagating carries. In the standard integer multiplication, the first operand is shifted as many times as the positions of bits equal to "1" in the second operand. The product of the two operands is derived by adding the shifted versions of the first operand with each other. In the carry-less multiplication the same procedure is followed except that additions do not generate or propagate carry. In this way, bit additions are equivalent to the XOR logical operation.

Carry-less multiplication is formally defined as follows: let the two operands be A, B, of size n bits each. Let the number A be the following array of bits:

$$A=[a_{n-1}\, a_{n-2} \ldots a_0] \quad (1)$$

Let also the number B be:

$$B=[b_{n-1}\, b_{n-2} \ldots b_0] \quad (2)$$

Let the carry-less multiplication result be the following bit array:

$$C=[c_{2n-1}\, c_{2n-2} \ldots c_0] \quad (3)$$

The bits of the output C are defined as the following logic functions of the bits of the inputs A and B:

$$c_0 = a_0 b_0 \quad (4)$$

$$c_1 = a_0 b_1 \oplus a_1 b_0$$

$$\ldots$$

$$c_{n-1} = a_0 b_{n-1} \oplus a_1 b_{n-2} \oplus \ldots \oplus a_{n-1} b_0$$

and:

$$c_n = a_1 b_{n-1} \oplus a_2 b_{n-2} \oplus \ldots \oplus a_{n-1} b_1 \quad (5)$$

$$\ldots$$

$$c_{2n-2} = a_{n-1} b_{n-1}$$

$$c_{2n-1} = 0$$

Equations (4) and (5) may be written in compact form as:

$$c_i = \bigoplus_{j=0}^{i} a_j b_{i-j} \quad (6)$$

for $0 \leq i \leq n-1$, and:

$$c_i = \bigoplus_{j=i-n+1}^{n-1} a_j b_{i-j} \quad (7)$$

for $n-1 \leq i \leq 2n-1$.
(note that $C_{2n-1} = 0$)

Some current implementations of the GCM mode may use a table lookup algorithm that consists of two phases. First, during a preprocessing phase 16 different tables may be created. Each table has 256 entries and each entry is 128 bit long. Each entry j of table $T_i$ stores the value (j*hash key*$2^8_i$ with the) mod g. Second, run time phase in which the algorithm takes the next ciphertext block and XOR-s it with the current value of the Galois Hash. The result is multiplied with the Hash Key in GF ($2^{128}$) as follows: the value of the result is segmented into 16 slices, where each slice is 8 bit long. Subsequently, 16 table lookups are performed using the slices, for indexing the tables. The results from the table lookups are XOR-ed with each other. This algorithm performs operations on a per-byte basis: for each 128 bit block 16 table lookups and 16 128-bit XOR operations take place.

As can be seen, this algorithm may not be very efficient in software due to the cost of table lookups. The total size of the tables required for this algorithm is 16-256-16 bytes=64K bytes. Since processors typically may have 32K bytes in their L1 cache, these tables do not fit in this cache, and have to be accessed from the second level (L2) cache or other less accessible memory, which introduces latency. For example, accessing the L2 cache implies a significant performance penalty, even if memory accesses may be pipelined. For example, with caches associated with access time of 10-20 clock cycles (hereafter referred to as "clocks"), the measured cost of GCM might be 20 cycles/byte.

Figure 2:
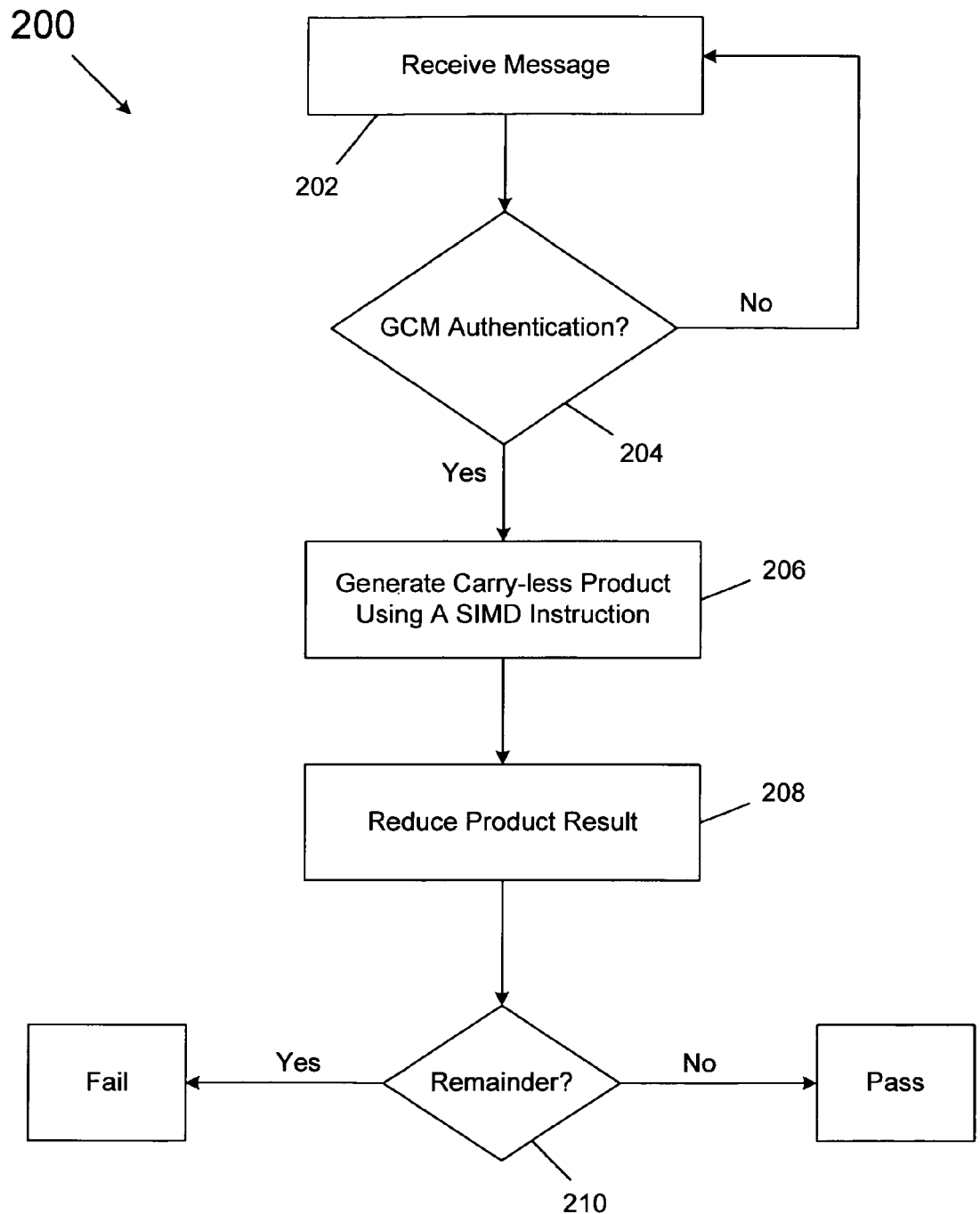
FIGS. 2 and 3 illustrate flow diagrams of methods, according to some embodiments of the invention.

FIG. 2 illustrates a block diagram of a method 200 to perform operations associated with GCM, in accordance with an embodiment of the invention. In one embodiment, various components discussed herein, e.g., with reference to FIGS. 1 and 4-5 may be utilized to perform one or more of the operations discussed with reference to FIG. 2. For example, the method 200 may be used to perform GCM on data communicated over the network 403 of FIGS. 4-5.

Referring to FIG. 2, at an operation 202, a message may be received (e.g., in the form of a data packet communicated over a computer network such as network 403). At an operation 204, it may be determined whether the received message is to be authenticated in accordance with GCM (e.g., ciphertext(s) 106-1, 106-2, etc. are to be authenticated). In an embodiment, a portion of a data packet (corresponding to an encrypted message) communicated over the network 403 (such as the packet header) may be decoded at operation 204 to determine whether the message is to be authenticated in accordance with GCM.

At an operation 206, a carry-less product may be generated using a SIMD instruction. In an embodiment, a 128-bit by 128-bit carry-less multiplication may be performed to generate the product at operation 206, e.g., by utilizing a 64-bit SIMD instruction (e.g., the PCLMULQDQ instruction discussed herein) as follows.

In one embodiment, the PCLMULQDQ instruction may be used to perform a carry-less multiplication of two 64-bit quadwords which are selected from the first and the second operands according to an immediate byte value. The instruction may have the following format, in one embodiment:

PCLMULQDQ xmm1, xmm2/m128, imm8 where xmm1 is a first source operand (and also the destination location) and which may correspond to a SIMD register, xmm2/m128 is a second source operand and which may be another SIMD register or a memory location, and imm8 is an immediate datum.

When decoded and executed by a processor such as a processor having SIMD support (e.g., SIMD execution units, vector registers and so forth), a carry-less multiplication occurs. Specifically, responsive to the instruction one quadword (8-bytes) of xmm1 and one quadword (8-bytes) of xmm2/m128 are carry-less multiplied, returning a double quadword (16 bytes). The immediate byte is used for determining which quadwords of xmm1 and xmm2/m128 should be used. In one embodiment, the immediate byte values of Table 1 are used as follows, although the scope of the present invention is not limited in this regard.

TABLE 1

| imm[7:0] | Operation |
|----------|-----------|
| 0x00 | xmm2/m128[63:0] * xmm1[63:0] |
| 0x01 | xmm2/m128[63:0] * xmm1[127:64] |
| 0x10 | xmm2/m128[127:64] * xmm1[63:0] |
| 0x11 | xmm2/m128[127:64] * xmm1[127:64] |

The pseudo code for performing the carry-less multiplication operation according to this instruction and the above Table 1 is as follows:

TABLE 2

```
IF imm8[0] == 0 THEN
    Temp1 = xmm1[63:0]
ELSE
    Temp1 = xmm1[127:64]
ENDIF
IF imm8[1] == 0 THEN
    Temp2 = xmm2/m128[63:0]
```

TABLE 2-continued

```
ELSE
    Temp2 = xmm2/m128[127:64]
ENDIF
FOR i = 0 TO 63
    TempB [i] : = (Temp1[0] AND Temp2[i]);
    FOR j = 1 TO I, 1
        TempB[i] : = TempB [i] XOR (Temp1[j] AND Temp2[i–j])
    NEXT j
    Dest[i] : = TempB[i];
NEXT i
FOR I = 64 TO 126, 1
    TempB [i] : = (Temp1[i–63] AND Temp2[63]);
    FOR j = i–62 TO 63, 1
        TempB[i] : = TempB [i] XOR (Temp1[j] AND Temp 2[i–j])
    NEXTj
    Dest[i] : = TempB[i];
NEXTi
Dest[127] : = 0;
```

The input operands may be denoted by $[A_1:A_0]$ and $[B_1:B_0]$, where $A_1$, $A_0$, $B_1$, and $B_0$ are 64 bits long each.

Different algorithms may be used to realize the 128-bit by 128-bit carry-less outputs. A first algorithm can be viewed as "one iteration carry-less schoolbook" multiplication. Here, multiplication carry-less occurs with the following operands: $A_0$ with $B_0$, $A_1$ with $B_1$, $A_0$ with $B_1$, and $A_1$ with $B_0$. Let the results of the above four multiplications be:

$$A_0 \cdot B_0 = [C_1:C_0], A_1 \cdot B_1 = [D_1:D_0], A_0 \cdot B_1 = [E_1:E_0], A_1 \cdot B_0 = [F_1:F_0]$$

Then, the 256-bit output of the multiplication $[A_1:A_0] \cdot [B_1:B_0]$ is constructed as follows:

$$[A_1:A_0] \cdot [B_1:B_0] = [D_1:F_1 \oplus E_1 \oplus D_0:F_0 \oplus E_0 \oplus C_1:C_0]$$

An alternative technique trades-off one multiplication for additional XOR operations. It can be viewed as "one iteration carry-less Karatsuba" multiplication. Here, multiply carry-less occurs with the following operands: $A_1$ with $B_1$, $A_0$ with $B_0$, and $A_0 \oplus A_1$ with $B_0 \oplus B_1$. Let the results of the above three multiplications be: $[C_1:C_0]$, $[D_1:D_0]$ and $[E_1:E_0]$, respectively. Then, the 256-bit output of the multiplication $[A_1:A_0] \cdot [B_1:B_0]$ is constructed as follows:

$$[A_1:A_0] \cdot [B_1:B_0] = [C_1:C_0 \oplus C_1 \oplus D_1 \oplus E_1:D_1 \oplus C_0 \oplus D_0 \oplus E_0:D_0]$$

Referring to FIG. 2, at an operation 208, the carry-less product generated at operation 206 may be reduced. Further details of reduction performed in accordance with an embodiment will be discussed herein with reference to FIG. 3 below.

At an operation 210, it may be determined whether a remainder exists (e.g., as determined based on the reduction performed at operation 208). If a remainder exists, then the authentication in accordance with GCM fails (which may be signaled by generation of an error signal in an embodiment). Otherwise, the authentication will be successful.

Figure 3:
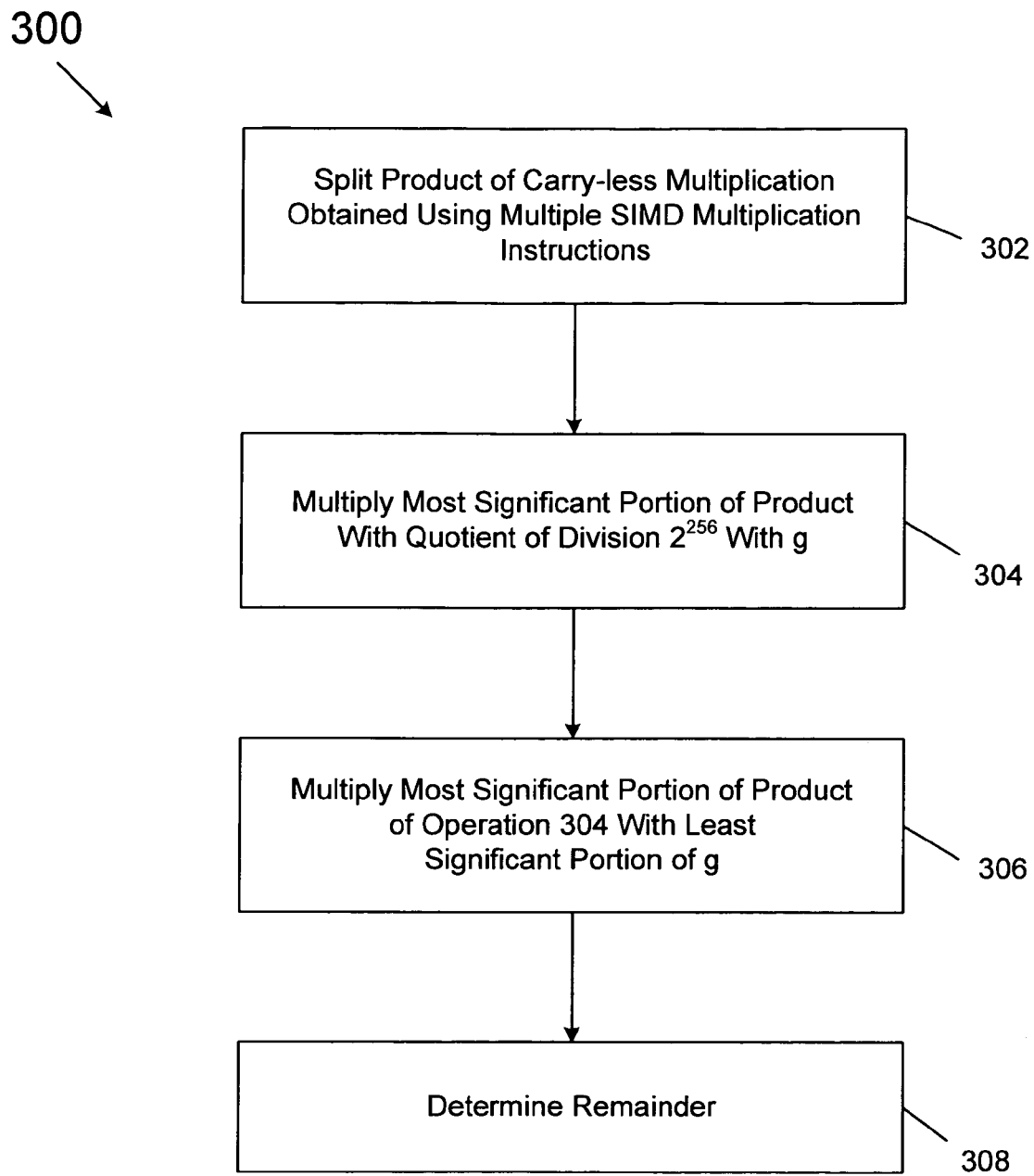

FIG. 3 illustrates a method 300 to perform a reduction in accordance with an embodiment. The method 300 illustrates further details of the operations 208 and/or 210 of FIG. 2 in accordance with one embodiment. As illustrated in FIG. 3, to reduce the (256-bit) product, the product obtained using multiple SIMD carry-less multiplication instructions (i.e., multiple PCLMULQDQ instructions) may be split into two (128-bit) parts at an operation 302. The least significant half may be XOR-ed with the final remainder since the degree of g is 128 as will be further discussed below. For the most significant part, division may be realized via two multiplications. Since the least significant half of the input does not need to be taken into account, an efficient generation of a remainder p(x) may be considered, defined as follows:

$$p(x) = c(x) \cdot x^t \mod g(x) \quad (9)$$

Here,
c(x) is a polynomial of degree s–1 with coefficients in GF(2), representing the most significant bits of the carry-less product. In the current case of AES-GCM, s=128.

t is the degree of the polynomial g. In the current case t=128.

g(x) is the irreducible polynomoial of the final field used in AES-GCM.

which is $g=g(x)=x^{28}+x^7+x^2+x+1$

For the polynomials p(x), c(x), and g(x):

$$c(x) = c_{s-1}x^{s-1} + c_{s-2}x^{s-2} + \ldots + c_1 x + c_0,$$

$$p(x) = p_{t-1}x^{t-1} + p_{t-2}x^{t-2} + \ldots + p_1 x + p_0, \text{ and}$$

$$g(x) = g_t x^t + g_{t-1} x^{t-1} + \ldots + g_1 x + g_0 \quad (10)$$

Hereafter, the notation $L^u(v)$ may be used to denote the coefficients of u least significant terms of the polynomial v and $M^u(v)$ to denote the coefficients of its u most significant terms. The polynomial p(x) may be expressed as:

$$p(x) = c(x) \cdot x^t \mod g(x) = g(x) \cdot q(x) \mod x^t \quad (11)$$

where q(x) is a polynomial of degree s–1 equal to the quotient from the division of $c(x) \cdot x^t$ with g. In equation (11), the t least significant terms of the dividend $c(x) \cdot x^t$ equal zero. Further, the dividend $c(x) \cdot x^t$ may be expressed as the sum of the polynomials $g \cdot q$ and p:

$$c(x) \cdot x^t = g(x) \cdot q(x) + p(x) \quad (12)$$

where operator '+' means XOR ('E'). From equation (12) one may expect that the t least significant terms of the polynomial $g \cdot q$ are equal to the terms of the polynomial p. Only if these terms are equal to each other, the result of the XOR operation $g \cdot q \oplus p$ is zero for its t least significant terms. Hence:

$$p(x) = g(x) \cdot q(x) \mod x^t = L^t(g(x) \cdot q(x)) \quad (13)$$

Now g(x) may be defined as:

$$g(x) = g_t x^t \oplus g^*(x) \quad (14)$$

The polynomial g* represents the t least significant terms of the polynomial g and:

$$p(x) = L^t(g(x) \cdot q(x)) = L^t(q(x) \cdot g^*(x) + q(x) \cdot g_t x^t) \quad (15)$$

However, the t least significant terms of the polynomial $q \cdot g_t \cdot x^t$ are zero. Therefore:

$$p(x) = L^t(q(x) \cdot g^*(x)) \quad (16)$$

From equation (16) it follows that in order to compute the remainder p we need to know the value of the quotient q. The quotient may be calculated in a similar manner:

$$(11) \Leftrightarrow c(x) \cdot x^{t+s} = g(x) \cdot q(x) \cdot x^s + p(x) \cdot x^s \quad (17)$$

Let:

$$x^{t+s} = g(x) \cdot q^+(x) + p^+(x) \quad (18)$$

where q+ is an s-degree polynomial equal to the quotient from the division of $x^{t+s}$ with g and p+ is the remainder from this division. The degree of the polynomial p+ is t–1. From equations (17) and (18) we get:

$$\left.\begin{array}{r}(17) \\ (18)\end{array}\right\} \Leftrightarrow c(x) \cdot g(x) \cdot q^+(x) + c(x) \cdot p^+(x) \quad (19)$$

$$= g(x) \cdot q(x) \cdot x^s + p(x) \cdot x^s$$

and $$(19) \Rightarrow M^s(c(x) \cdot g(x) \cdot q^+(x) + c(x) \cdot p^+(x)) \quad (20)$$
$$= M^s(g(x) \cdot q(x) \cdot x^s + p(x) \cdot x^s)$$

One may see that the polynomials $c \cdot g \cdot q^+$ and $g \cdot q \cdot x^s$ are of degree $t+2 \cdot s-1$ the polynomial $c \cdot p^+$ is of degree $t+s-2$, and the polynomial $p \cdot x^s$ is of degree $t+s-1$. As a result, the s most significant terms of the polynomials in the left and right hand side of equation (25) are not affected by the polynomials $c \cdot p^+$ and $p \cdot x^s$. Hence:

$$(20) \Leftrightarrow M^s(c(x) \cdot g(x) \cdot q^+(x)) \quad (21)$$
$$= M^s(g(x) \cdot q(x) \cdot x^s)$$

Next, we observe that the s most significant terms of the polynomial $c \cdot g \cdot q^+$ equal to the s most significant terms of the polynomial $g \cdot M^s(c \cdot q^+) \cdot x^s$. The polynomial $M^s(c \cdot q^+) \cdot x^s$ results from $c \cdot q^+$ by replacing the s least significant terms of this polynomial with zeros. Moreover, the s most significant terms of the polynomial $c \cdot g \cdot q^+$ may be calculated by adding the s most significant terms of the polynomial $c \cdot q^+$ with each other in as many offset positions as defined by the terms of the polynomial g. Thus, the s most significant terms of $c \cdot g \cdot q^+$ do not depend on the s least significant terms of $c \cdot q^+$, and consequently, $$(21) \Leftrightarrow M^s(g(x) \cdot M^s(c(x) \cdot q^+(x)) \cdot x^s) \quad (22)$$
$$= M^s(g(x) \cdot q(x) \cdot x^s)$$

Equation (22) is satisfied for q given by:

$$q = M^s(c(x) \cdot q^+(x)) \quad (23)$$

Since there is a unique quotient q satisfying equation (12) one may show that there is a unique quotient q satisfying equation (22). As a result this quotient q must be equal to $M^s(c(x) \cdot q^+(x))$. It follows that the polynomial p is found by:

$$p(x) = L^t(g^*(x) \cdot M^s(c(x) \cdot q^+(x))) \quad (24)$$

Accordingly, equation (24) indicates the operations for computing the polynomial p.

For the given irreducible polynomial g the polynomials g* and $q^+$ are computed first. The polynomial g* is of degree $t-1$ consisting of the t least significant terms of g, whereas the polynomial $q^+$ is of degree s and is equal to the quotient of the division of $x^{t+s}$ with the polynomial g.

The remainder polynomial may be calculated as follows:
Operation 1: The input c is multiplied with q+ (e.g., the 128 most significant bits of the product are multiplied with the quotient from the division $2^{256}$ with g at operation 304). The result is a polynomial of degree $2s-1$.
Operation 2: The s most significant terms of the polynomial resulting from operation 1 are multiplied with g* (e.g., the 128 most significant bits of the result of operation 304 are multiplied with g* at operation 306). The result is a polynomial of degree $t+s-2$.
Operation 3: The algorithm returns the t least significant terms of the polynomial resulting from operation 2 (e.g., by XOR-ing the least significant portion of the result of operation 304 with the 128 least significant bits of the input at an operation 308). This is the remainder.

One may see that this algorithm involves 2 128-bit carry-less multiplications and 1 128-bit XOR operation. For the carry-less multiplication, one may use the carry-less technique described above for the first phase.

Another embodiment may be applied if the special form of g (pentanomial) is taken into consideration. In one embodiment, this approach may be more efficient in some implementations. In particular, the quotient from the division of $x^{256}$ with g is g itself (e.g., as applied in operation 304). The polynomial $g = g(x) = x^{128} + x^7 + x^2 + x + 1$ is essentially the bit sequence [1:<120 zeros>:10000111]. Accordingly, in an embodiment, at operations 304-306, the bit sequence may be multiplied carry-lessly with a 128 bit value and the 128 most significant bits may be obtained by: (i) shifting the 64 most significant bits of the input by 63, 62 and 57 bit positions to the right; and (ii) XOR-ing these shifted copies with the 64 least significant bits of the input. Note that in one embodiment, these shift and XOR operations may be performed in the SIMD domain responsive to SIMD instructions, e.g., packed shift and shuffle instructions such as PSLLD, and PSRLD and PSHUFD instructions. Next, this 128 bit result may be carry-less multiplied with g, and the 128 least significant bits may be kept. In an embodiment, this may be done by: (i) shifting the 128-bit input by 1, 2 and 7 positions to the left; and (ii) XOR-ing the results.

To effect these operations, the input operand is denoted by $[X_3:X_2:X_1:X_0]$ where $X_3, X_2, X_1$ and $X_0$ are 64 bit long each. First, $X_3$ is shifted by 63, 62 and 57-bit positions to the right, and the following numbers are then computed:

$$A = X_3 >> 63$$
$$B = X_3 >> 62$$
$$C = X_3 >> 57$$

Next A, B and C may be XORed with $X_2$ to compute a number D as follows:

$$D = X_2 \oplus A \oplus B \oplus C$$

Thereafter $[X_3:D]$ is shifted by 1, 2 and 7 bit positions to the left, and the following numbers are computed:

$$[E_1:E_0] = [X_3:D] << 1$$
$$[F_1:F_0] = [X_3:D] << 2$$
$$[G_1:G_0] = [X_3:D] << 7$$

After this, $[E_1:E_0]$, $[F_1:F_0]$, and $[G_1:G_0]$ are XORed with each other and $[X_3:D]$, such that a number $[H_1:H_0]$ is computed as follows:

$$[H_1:H_0] = [X_3 \oplus E_1 \oplus F_1 \oplus G_1 : D \oplus E_0 \oplus F_0 \oplus G_0]$$

Finally, the remainder value is returned as $[X_1 \oplus H_1 : X_0 \oplus H_0]$.

In some implementations, a bit reflection peculiarity of GCM can be taken into account when implementing the GCM mode, because the standard specifies that the bits inside their 128-bit double-quad-words are reflected. That is, the bit corresponding to the least significant coefficient of the polynomial representation of the entities which are multiplied is bit number 127 rather than bit number 0. This also implies that the order of bits in the reduction polynomial is [11100001:<120 zeros>:1] as opposed to [1:<120 zeros>:10000111]. Note that this property is not merely the difference between Little Endian and Big Endian notations.

To handle this peculiarity, consider the following fundamental property of carry-less multiplication namely:

$$\text{reflected}(A) \cdot \text{reflected}(B) = \text{reflected}(A \cdot B) >> 1$$

Thus in one embodiment, the PCLMULQDQ instruction can be used for performing multiplication in the finite field GF ($2^{128}$) seamlessly, regardless on the representation of the input and the output operands. The following outlines modification of a reduction algorithm in accordance with an embodiment of the present invention that accommodates bit reflection of the inputs and the outputs in the GCM mode.

Denote the input operand by $[X_3:X_2:X_1:X_0]$ where $X_3$, $X_2$, $X_1$ and $X_0$ are 64 bit long each. First, compute:

$$[X_3X_2X_1X_0] = = [X_3X_2X_1X_0] << 1.$$

Next, $X_0$ is shifted by 63, 62 and 57 bit positions to the left to compute the following numbers:

$$A = X_0 << 63$$

$$B = X_0 << 62$$

$$C = X_0 << 57$$

Then, A, B, and C are XORed with $X_1$, and a number D is computed as follows:

$$D = X_1 \oplus A \oplus B \oplus C.$$

Then, $[D:X_0]$ is shifted by 1, 2 and 7 bit positions to the right and the following numbers are computed:

$$[E_1:E_0] = [D:X_0] >> 1$$

$$[F_1:F_0] = [D:X_0] >> 2$$

$$[G_1:G_0] = [D:X_0] >> 7$$

After this, $[E_1:E_0]$, $[F_1:F_0]$, and $[G_1:G_0]$ are XORed with each other and $[D:X_0]$, such that a number $[H_1:H_0]$ is computed as follows:

$$[H_1:H_0] = [D \oplus E_1 \oplus F_1 \oplus G_1 : X_0 \oplus E_0 \oplus F_0 \oplus G_0]$$

Finally, the remainder value is returned as $[X_3 \oplus H_1 : X_2 \oplus H_0]$.

In another implementation, the bit shifting done above may be performed in accordance with the following use of load, move and SIMD shift and XOR instructions.

TABLE 3

| | |
|---|---|
| 0. load xmm1 | |
| 1. movdqu xmm2, xmm1 | // copy xmm2 = xmm1 |
| 2. PSLLD xmm1, imm8=k | // left shift k bit position in doublewords, shift in 0 |
| | // example for k=2 |
| | // X3[29-0] ‖ [00] X2[29-0] ‖ [00] X1[29-0] ‖ [00] X0[29-0] ‖ [00] |
| 3. PSRLD xmm2, imm8= 32-k | // right shift 32-k positions |
| | // example for k=2 |
| | //00...00 X3[31-30] ‖ 00...00 X2[31-30] ‖00...00 X1[31-30] ‖00...00 X0[31-30] |
| 4. PSLLDQ xmm2, imm8=4 | // left shift xmm2 by 4 bytes |
| | //xmm2 = 00...00 X2[31-30] ‖00...00 X1[31-30] ‖00...00 X0[31-30] ‖ 000...000 |
| 5. PXOR xmm2, xmm1 | |

Linear folding is the mathematical operation of replacing a number of most significant bits of a quantity with the product of these bits times a constant during a reduction. Folding helps with speeding up a reduction because it decreases the length of the quantity that is being reduced at the expense of the number of multiplications needed. In what follows, assume that all operations that take place are carry-less, i.e., in GF(2) arithmetic.

Suppose that the quantity to the reduced can be expressed as the sum of two polynomials:

$$p(x) = (c(x) \cdot x^t + d(x)) \bmod g(x) \quad (25)$$

where $c(x)$ is a polynomial of degree $s-1$ with coefficients in GF(2), representing the most significant bits of the quantity to be reduced; $t-1$ is the length of the degree of $d(x)$, and $g(x)$ is the irreducible polynomial defining the field (for GCM, $g = g(x) = x^{128} + x^7 + x^2 + x + 1$).

For the polynomial p(x):

$$p(x) = (c(x) \cdot x^t + d(x)) \bmod g(x) = \quad (26)$$

$$c(x) \cdot x^t \bmod g(x) + d(x) \bmod g(x) =$$

$$(c(x) \cdot (x^t \bmod g(x)) + d(x)) \bmod g(x)$$

The quantity $x^t \bmod g(x)$ depends only on the reduction polynomial. Hence it can be treated as a constant. Equation 26 indicates a method for performing reduction which is called linear folding and works as follows:

Step 1: The polynomial $c(x)$ is multiplied carry-less with the constant $x^t \bmod g(x)$.

Step 2: The result of the multiplication is XORed with $d(x)$.

Step 3: The reduction proceeds using any known technique.

The remainder from the division of $x^t$ with $g(x) = x^{128} + x^7 + x^2 + x + 1$ is the bit sequence <10000111:t–128 zeros>. Since t+s=255, one can see that the length of the carry-less multiplication of $c(x)$ with $x^t \bmod g(x)$ is 134 and is independent of the choice of t and s.

In GCM, all operations are bit reflected, so folding can be implemented in a bit reflected manner also. The designer of an algorithm based on linear folding has several degrees of freedom that depend on the choice of t and s. If the length of the folding quantity $c(x)$ spans a single 64-bit word then the cost of multiplication with $x^t \bmod g(x)$ can be potentially small, equal to 1 or 2 64-bit carry-less multiplication operations. On the other hand the cost of further reducing the given polynomial after folding may be higher.

Another issue related to the design of a folding algorithm has to do with the fact that the reflected version of $x^t \bmod g(x)$ may span one or multiple words. Theoretically one can multiply $c(x)$ not with $x^t \bmod g(x)$ but with an appropriately shifted version of the bit sequence <11100001> so that the second operand of the multiplication spans exactly one 64 bit word. The result can then be corrected with further shift operations. There is one case for which the second operand of the multiplication spans one word and no further shifts are required: this is for t=193. For this case, the subsequent reduction steps after folding requiring reducing a 193 bit quantity.

In what follows, four representative algorithms: two for s=120 and two for s=64 bits are shown. In each pair, the second operand of the folding multiplication spans 1 or 2 words.

Algorithm A, which is a folding length s=120, two multiplications version. Denote the input operand by $[X_3:X_2:X_1:X_0]$ where $X_3$, $X_2$, $X_1$ and $X_0$ are 64-bit long each.

Step 1: Compute $[C_1:C_0]=[X_1:X_0]$ AND 0x00ffffffffffffffffff

Step 2: Compute $[H_2:H_1:H_0]=[C_1:C_0] \cdot$ 0xe100000000000000

Step 3: Shift $[H_2:H_1:H_0]$ by one bit position to the left

Step 4: XOR $[H_2:H_1:H_0]$ with $[X_3:X_2:X_1:X_0]$ and replace $[X_3:X_2:X_1:X_0]$ Step 5: Replace $X_1$ with the result of logical AND between $X_1$ and 0xff00000000000000

Step 6: Compute $A=X_1>>63$, $B=X_1<<1$, $C=(X_1$ & 0x7f00000000000000$)>>1$,
$D=(X_1$ & 0x7f00000000000000$)>>6$, $E=X_1$ & 0x7f00000000000000.

Step 7: Shift $[X_3:X_2:A]$ by one bit position to the left.
Return $[X_3 \oplus B \oplus C \oplus D \oplus E:X_2]$.

Algorithm B, which is a folding length s=120, four multiplications version. Denote the input operand by $[X_3:X_2:X_1:X_0]$ where $X_3, X_2, X_1$ and $X_0$ are 64-bit long each.

Step 1: Compute $[C_1:C_0]=[X_1:X_0]$ AND 0x00ffffffffffffffffff

Step 2: Compute $[H_2:H_1:H_0]=[C_1:C_0] \cdot$ 0x1c200000000000000

Step 3: XOR $[H_2:H_1:H_0]$ with $[X_3:X_2:X_1:X_0]$ and replace $[X_3:X_2:X_1:X_0]$ Step 4: Replace $X_1$ with the result of logical AND between $X_1$ and 0xff00000000000000

Step 5: Compute $A=X_1>>63$, $B=X_1<<1$, $C=(X_1$ & 0x7f00000000000000$)>>1$,
$D=(X_1$ & 0x7f00000000000000$)>>6$, $E=X_1$ & 0x7f00000000000000.

Step 6: Shift $[X_3:X_2:A]$ by one bit position to the left.
Return $[X_3 \oplus B \oplus C \oplus D \oplus E:X_2]$.

Algorithm C, which is a folding length s=64, single multiplication version. Denote the input operand by $[X_3:X_2:X_1:X_0]$ where $X_3, X_2, X_1$ and $X_0$ are 64-bit long each.

Step 1: Compute $[H_1:H_0]=X_0 \cdot$ 0xe100000000000000

Step 2: Shift $[H_1:H_0]$ by one bit position to the left

Step 3: XOR $[0:H_1:H_0:0]$ with $[X_3:X_2:X_1:X_0]$ and replace $[X_3:X_2:X_1:X_0]$ Step 4: Compute $A=X_1>>63$, $B=X_1<<1$, $C_1=(X_1$ & 0x7f00000000000000$)>>1$, $C_0=X_1<<63$, $D_1=(X_1$ & 0x7f00000000000000$)>>6$, $D_0=X_1<<58$, $E=X_1$ & 0x7f00000000000000

Step 5: Shift $[X_3:X_2:A]$ by one bit position to the left.
Return $[X_3 \oplus B \oplus C_1 \oplus D_1 \oplus E:X_2 \oplus D_0 \oplus C_0]$.

Algorithm D, which is a folding length s=64, two multiplications version. Denote the input operand by $[X_3:X_2:X_1:X_0]$ where $X_3, X_2, X_1$ and $X_0$ are 64-bit long each.

Step 1: Compute $[H_2:H_1:H_0]=X_0*$0x1c200000000000000

Step 2: XOR $[H_2:H_1:H_0:0]$ with $[X_3:X_2:X_1:X_0]$ and replace $[X_3:X_2:X_1:X_0]$ Step 3: Compute $A=X_1>>63$, $B=X_1<<1$, $C_1=(X_1$ & 0x7f00000000000000$)>>1$,
$C_0=X_1<<63$, $D_1=(X_1$ & 0x7f00000000000000$)>>6$, $D_0=X_1<<58$, $E=X_1$ & 0x7f00000000000000

Step 4: Shift $[X_3:X_2:A]$ by one bit position to the left.
Return $[X_3 \oplus B \oplus C_1 \oplus D_1 \oplus E:X_2 \oplus D_0 \oplus C_0]$.

Referring now to Table 4, shown is pseudo code showing the use of SIMD instructions to perform a GCM computation in accordance with one embodiment of the present invention.

TABLE 4

```
;;;;;;;;;;;;;;;;;;;;;;;;;;;;;;;;;;;;;;;;;;;;;;;;;;;;
;;;;;;;;;;;;;;;;;;;;;;;;;;;;;;;;;;;;;;;;;;;;;;;;;;;;
;
;int sse_ckmul_gcm( )
;
;;;;;;;;;;;;;;;;;;;;;;;;;;;;;;;;;;;;;;;;;;;;;;;;;;;;
sse_clmul_gcm PROC
; xmm0, xmm1 hold the values for the two operands which are carry-less multiplied
    movdqu     xmm3, xmm0
    pclmulqdq  xmm3, xmm1, 0x00   ;xmm3 holds a0*b0
    movdqu     xmm4, xmm0
    pclmulqdq  xmm4, xmm1, 0x10   ;xmm4 holds a0*b1
    movdqu     xmm5, xmm0
    pclmulqdq  xmm5, xmm1, 0x01   ;xmm5 holds a1*b0
    movdqu     xmm6, xmm0
    pclmulqdq  xmm6, xmm1, 0x11   ;xmm6 holds a1*b1
    pxor       xmm4, xmm5         ;xmm4 holds a0*b1 + a1*b0
    pshufd     xmm5, xmm4, 78     ;swap the 64 most and least significant bits of xmm4
    movdqu     xmm4, xmm5
    pand       xmm4, xmm14        ;xmm14 holds the mask
                                  0x0000000000000000ffffffffffffffff
    pand       xmm5, xmm15        ;xmm15 holds the mask
                                  0xffffffffffffffff0000000000000000
    pxor       xmm3, xmm5
    pxor       xmm6, xmm4         ; register pair <xmm6:xmm3> holds the result of
                                  ; the carry-less multiplication of xmm0 by xmm1
;we shift the result of the multiplication by one bit position to the left cope for the fact
;that bits are reversed
    movdqu     xmm7, xmm3
    movdqu     xmm8, xmm6
    pslld      xmm3, 1
    pslld      xmm6, 1
    psrld      xmm7, 31
    psrld      xmm8, 31
    pshufd     xmm7, xmm7, 147
    pshufd     xmm8, xmm8, 147
    movdqu     xmm9, xmm7
    pand       xmm7, xmm13        ;xmm13 holds the mask 0xffffffffffffffffffffffff00000000
    pand       xmm8, xmm13
    pand       xmm9, xmm12        xmm12 holds the mask
                                  0x000000000000000000000000ffffffff
    por        xmm3, xmm7
```

TABLE 4-continued

```
por        xmm6, xmm8
por        xmm6, xmm9
;first phase of the reduction
movdqu     xmm7, xmm3
movdqu     xmm8, xmm3
movdqu     xmm9, xmm3              ;move xmm3 into xmm7, xmm8, xmm9 in order to perform
                                   ; the three shifts independently
pslld      xmm7, 31                ; packed right shifting << 31
pslld      xmm8, 30                ; packed right shifting shift << 30
pslld      xmm9, 25                ; packed right shifting shift << 25
pxor       xmm7, xmm8              ;xor the shifted versions
pxor       xmm7, xmm9
pshufd     xmm8, xmm7, 57          ;move the least significant 32-bit word to
                                   ; the most significant word position
                                   ; and right shift all other three 32-bit words by 32 bits
movdqu     xmm7, xmm8
pand       xmm7, xmm11             ;xmm11 holds the mask
                                   0xffffffff000000000000000000000000
pxor       xmm3, xmm7              ;first phase of the reduction complete
;second phase of the reduction
movdqu     xmm2, xmm3              ; make 3 copies of xmm3 (in in xmm10, xmm11, xmm12)
                                   ; for doing three shift operations
movdqu     xmm4, xmm3
movdqu     xmm5, xmm3
psrld      xmm2, 1                 ; packed left shifting >> 1
psrld      xmm4, 2                 ; packed left shifting >> 2
psrld      xmm5, 7                 ; packed left shifting >> 7
pxor       xmm2, xmm4              ; xor the shifted versions
pxor       xmm2, xmm5
movdqu     xmm5, xmm11
pandn      xmm5, xmm8
pxor       xmm2, xmm5
pxor       xmm3, xmm2
pxor       xmm6, xmm3              ;the result is in xmm6
RET
sse gfmul gcm ENDP
```

In addition to enabling high performance (e.g., 10 gigabits per second (Gbps)) secure networking, some embodiments may be applied to other network security applications such as virtual private networks (VPNs), network edge devices, etc. Furthermore, the currently used hash family Secure Hash Algorithm (SHA) may scale badly because its state increases with digest length. Techniques discussed herein may provide an alternative to SHA with AES-based authenticity schemes implemented in accordance with some embodiments discussed herein. Other implementations may utilized some of the embodiments discussed here for elliptic curve cryptography over binary fields (e.g., in accordance with FIPS 186-2, "Digital Signature Standard", Federal Information Processing Standard Publication FIPS 186-2, Jan. 27, 2000, available at: http://csrc.nist.gov/publications/fips), with fast bit reflection such as cyclical redundancy code (CRC) algorithms with general polynomials, etc.

Figure 4:
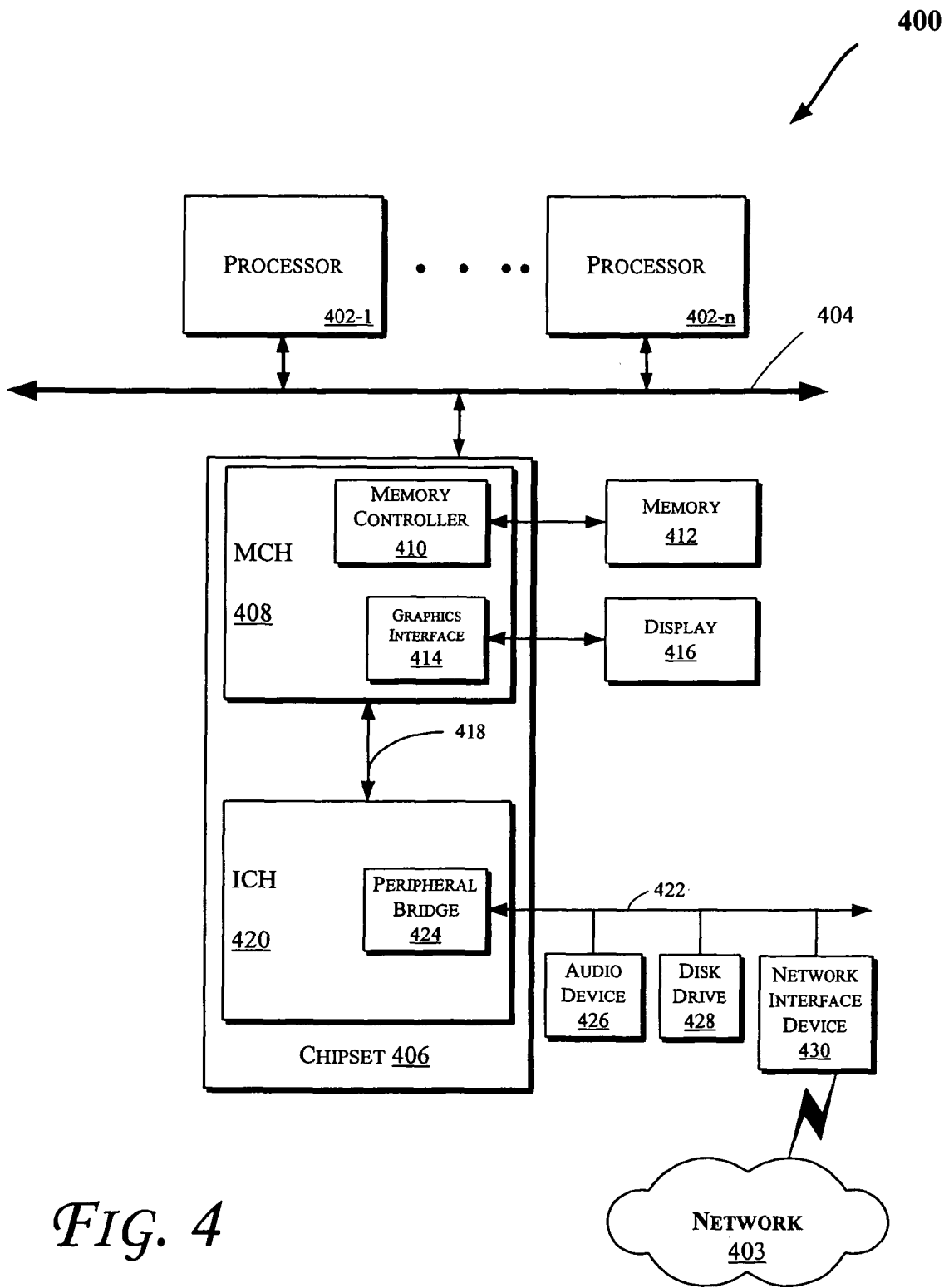
FIGS. 4 and 5 illustrate block diagrams of embodiments of computing systems, which may be utilized to implement some embodiments discussed herein.

FIG. 4 illustrates a block diagram of an embodiment of a computing system 400. In various embodiments, one or more of the components of the system 400 may be provided in various electronic devices capable of performing one or more of the operations discussed herein with reference to some embodiments of the invention. For example, one or more of the components of the system 400 may be used to perform the operations discussed with reference to FIGS. 1-3, e.g., by processing ciphertext(s) data 106-1, 106-2, etc. in accordance with the operations discussed herein. Also, various storage devices discussed herein (e.g., with reference to FIGS. 4 and/or 5) may be used to store data, operation results, etc. In one embodiment, data received over the network 403 (e.g., via network interface devices 430 and/or 530) may be stored in caches (e.g., L1 caches in an embodiment) present in processors 402 and/or 502. These processors may then apply the operations discussed herein in accordance with GCM (such as one or more of the operations of FIGS. 1-3) to authenticate messages.

Moreover, the computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. Moreover, the operations discussed with reference to FIGS. 1-2 may be performed by one or more components of the system 400.

A chipset 406 may also communicate with the interconnection network 404. The chipset 406 may include a memory control hub (MCH) 408. The MCH 408 may include a memory controller 410 that communicates with a memory 412. The memory 412 may store data, including sequences of instructions that are executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display 416. In one embodiment of the invention, the graphics interface 414 may communicate with the display 416 via an accelerated graphics port (AGP). In an embodiment of the invention, the display 416 may be a flat panel display that communicates with the graphics interface 414 through, for example, a signal converter that translates a digital representation of an image stored in a storage device such as video memory or system memory into display signals that are interpreted and displayed by the display 416. The display signals produced by the interface 414 may pass through various control devices before being interpreted by and subsequently displayed on the display 416.

A hub interface 418 may allow the MCH 408 and an input/output control hub (ICH) 420 to communicate. The ICH 420 may provide an interface to I/O devices that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430, which may be in communication with the computer network 403. In an embodiment, the device 430 may be a NIC capable of wireless communication. Other devices may communicate via the bus 422. Also, various components (such as the network interface device 430) may communicate with the MCH 408 in some embodiments of the invention. In addition, the processor 402 and the MCH 408 may be combined to form a single chip. Furthermore, the graphics interface 414 may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 400 may be arranged in a point-to-point (PtP) configuration such as discussed with reference to FIG. 5. For example, processors, memory, and/or input/output devices may be interconnected by a number of point-to-point interfaces.

Figure 5:
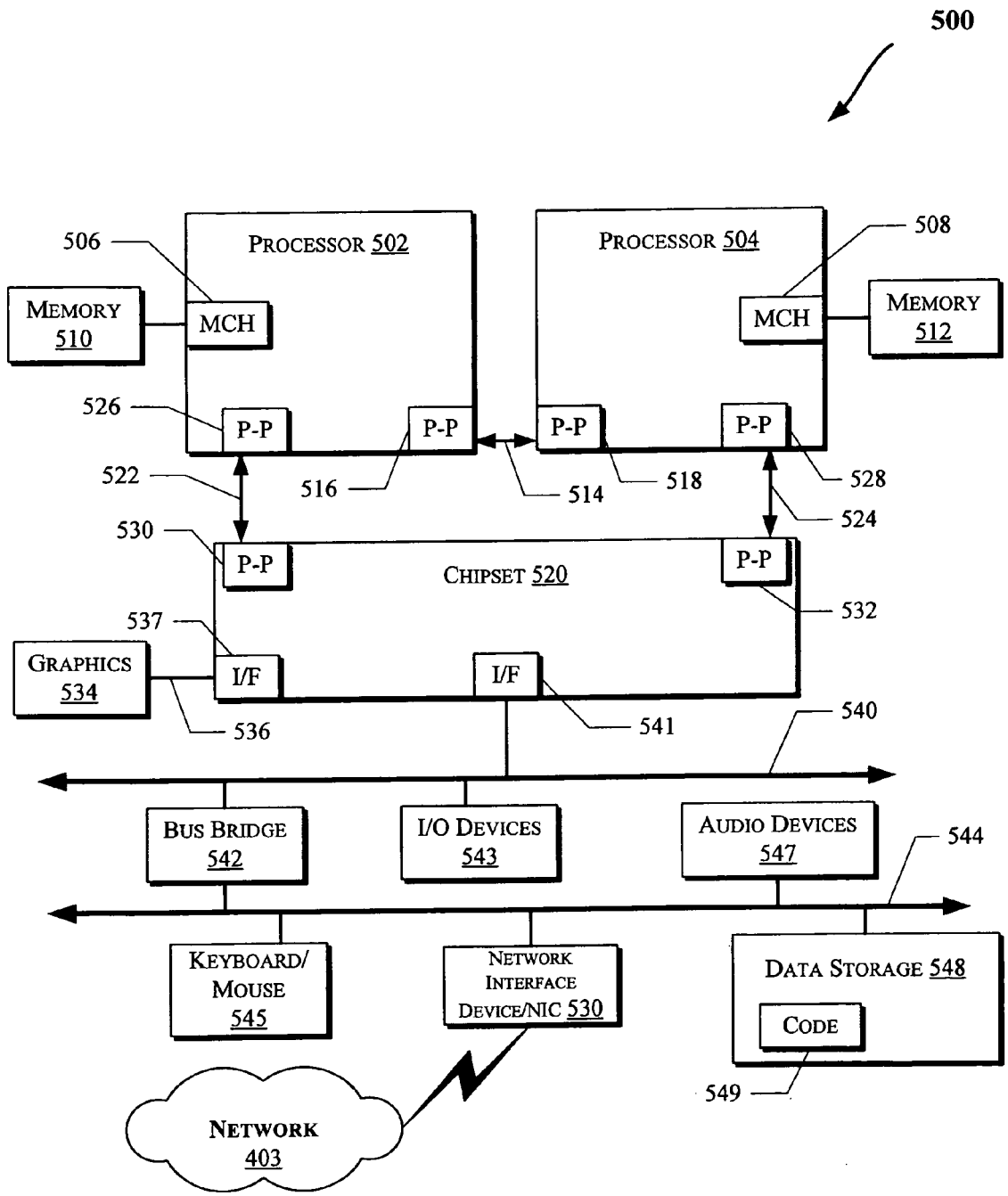

More specifically, FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include a local memory controller hub (MCH) 506 and 508 to couple with memories 510 and 512. The memories 510 and/or 512 may store various data such as those discussed with reference to the memory 412 of FIG. 4.

The processors 502 and 504 may be any suitable processor such as those discussed with reference to the processors 402 of FIG. 4. The processors 502 and 504 may exchange data via a point-to-point (PtP) interface 514 using PtP interface circuits 516 and 518, respectively. The processors 502 and 504 may each exchange data with a chipset 520 via individual PtP interfaces 522 and 524 using point to point interface circuits 526, 528, 530, and 532. The chipset 520 may also exchange data with a high-performance graphics circuit 534 via a high-performance graphics interface 536, using a PtP interface circuit 537.

At least one embodiment of the invention may be provided by utilizing the processors 502 and 504. For example, the processors 502 and/or 504 may perform one or more of the operations of FIGS. 1-3. Furthermore, using an algorithm such as set forth in Table 4, the operations all may be performed in a vector domain (i.e., using vector functional units and register files), thus avoiding the need to transfer data between such vector components and a scalar domain including scalar functional units and scalar register files. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may be coupled to a bus 540 using a PtP interface circuit 541. The bus 540 may have one or more devices coupled to it, such as a bus bridge 542 and I/O devices 543. Via a bus 544, the bus bridge 543 may be coupled to other devices such as a keyboard/mouse 545, the network interface device 530 discussed with reference to FIG. 5 (such as modems, network interface cards (NICs), or the like that may be coupled to the computer network 403), audio I/O device, and/or a data storage device 548. The data storage device 548 may store code 549 that may be executed by the processors 502 and/or 504.

Thus embodiments that support a PCLMULQDQ instruction, when combined with the operations discussed herein, can enable a general purpose processor (e.g., based on Core Microarchitecture of Intel® Corporation) to support 10 Gbps networking. Also, AES-GCM may be computationally intensive with the current instruction set of processors (e.g., even with no AES acceleration included), e.g., being associated with a latency of 45 cycles/byte in some implementations. If only AES is accelerated in hardware, the AES-GCM cost may be reduced to 20 cycles/byte, which still may not support high bandwidth networking. On the other hand, with a PCLMULQDQ instruction using the speed up techniques discussed herein, and accelerated AES in hardware, a single processor core may perform AES-GCM (i.e., bulk encryption and authentication in high speed packet processing) in a range of 10 Gbps. For example, consider a 4 GHz clock rate for a hypothetical processor core, and a (worst case) 3 clock AES round implementation. Here, using the proposed techniques, the GCM may be performed in 3.3 clocks/byte, translating to 10 Gbps.

Additionally, the difference between the embodiments discussed herein and other hardware realizations may be that the PCLMULQDQ instruction is not field specific and thus may be used in a variety of other applications (e.g., Elliptic Curve Cryptography). To avoid using a field-specific tree of XOR gates for reduction, at least some of the reduction approaches discussed herein may use a relatively small number of shift and XOR operations in software in some embodiments.

In various embodiments of the invention, the operations discussed herein, e.g., with reference to FIGS. 1-5, may be implemented as hardware (e.g., logic circuitry), software (including, for example, micro-code that controls the operations of a processor such as the processors discussed with reference to FIGS. 4-5), firmware, or combinations thereof, which may be provided as a computer program product, e.g., including a tangible machine-readable or computer-readable medium having stored thereon instructions (or software procedures) used to program a computer (e.g., a processor or other logic of a computing device) to perform the operations discussed herein. The machine-readable medium may include a storage device such as those discussed with respect to FIGS. 4-5.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
multiplying a most significant portion of a product of a carry-less multiplication performed using a first single instruction multiple data (SIMD) multiplication instruction in a processor with a first value to generate a second value in the processor;
multiplying a most significant portion of the second value with a least significant portion of an irreducible polynomial of a final field used in a block cipher to generate a third value in the processor;
determining a remainder based on the third value; and
generating a signal based on a value of the remainder, wherein the value of the remainder indicates whether an encrypted message is authentic in accordance with a Galois Counter Mode (GCM), wherein the first value comprises a quotient from a division of $2^{256}$ with the irreducible polynomial of the final field used in the block cipher in accordance with the GCM.

2. The method of claim 1, further comprising executing a plurality of the first SIMD multiplication instruction in a SIMD unit of the processor to obtain the product of the carry-less multiplication, wherein each of the plurality of the first SIMD multiplication instruction is associated with a different immediate datum.

3. The method of claim 2, wherein each of the plurality of the first SIMD multiplication instruction is to execute on a portion of a first operand and a second operand responsive to the immediate datum associated with the corresponding first SIMD multiplication instruction.

4. The method of claim 3, further comprising storing a temporary product of each of the plurality of the first SIMD multiplication instruction in a corresponding SIMD register of the processor.

5. The method of claim 4, further comprising exclusive-OR-ing (XOR) a first temporary product and a second temporary product according to a second SIMD instruction and shuffling the XOR result according to a third SIMD instruction.

6. The method of claim 5, further comprising accessing the first temporary product and the second temporary product directly from the corresponding SIMD registers and without a scalar domain-to-SIMD domain crossing.

7. The method of claim 1, further comprising left shifting the product of the carry-less multiplication to accommodate a bit reflection property of the GCM.

8. The method of claim 1, further comprising performing the first multiplying and the second multiplying according to a linear folding algorithm.

9. A non-transitory computer-readable storage medium comprising one or more instructions that when executed on a processor enable the processor to:
multiply a most significant portion of a product of a carry-less multiplication performed using a first single instruction multiple data (SIMD) multiplication instruction with a first value to generate a second value;
multiply a most significant portion of the second value with a least significant portion of an irreducible polynomial of a final field used in a block cipher to generate a third value;
determine a remainder based on the third value; and
generate a signal based on a value of the remainder, wherein the value of the remainder indicates whether an encrypted message is authentic in accordance with Galois Counter Mode (GCM).

10. The non-transitory computer-readable storage medium of claim 9, further comprising instructions that enable the processor to execute a plurality of the first SIMD multiplication instruction in a SIMD unit of the processor to obtain the product of the carry-less multiplication, wherein each of the plurality of the first SIMD multiplication instruction is associated with a different immediate datum.

11. The non-transitory computer-readable storage medium of claim 10, wherein each of the first SIMD multiplication instructions is to execute on a portion of a first operand and a second operand responsive to the immediate datum associated with the corresponding first SIMD multiplication instruction.

12. The non-transitory computer-readable storage medium of claim 11, further comprising instructions that enable the processor to store a temporary product of each of the plurality of first SIMD multiplication instructions in a corresponding SIMD register.

13. The non-transitory computer-readable storage medium of claim 12, further comprising instructions that enable the processor to exclusive-OR (XOR) a first temporary product and a second temporary product according to a second SIMD instruction and shuffle the XOR result according to a third SIMD instruction.

14. A system comprising:
a processor including an encryption module to obtain a product of a carry-less multiplication using a plurality of first single instruction multiple data (SIMD) multiplication instructions each to execute on a portion of a first operand and a second operand responsive to an immediate datum associated with the corresponding first SIMD multiplication instruction, and to reduce the product modulo g to form a message authentication code of a mode of a block cipher;
a memory coupled to the processor to store the plurality of first SIMD multiplication instructions;
wherein the encryption module includes a SIMD unit to execute the plurality of SIMD multiplication instructions;
wherein the encryption module is to store a temporary product of each of the plurality of first SIMD multiplication instructions in a corresponding SIMD register; and wherein the encryption module is to exclusive-OR (XOR) a first temporary product and a second temporary product according to a second SIMD instruction and shuffle the XOR result according to a third SIMD instruction.

15. The system of claim 14, wherein the encryption module is to access the first temporary product and the second temporary product directly from the corresponding SIMD registers and without a scalar domain-to-SIMD domain crossing.

16. The system of claim 14, wherein the encryption module is to form the message authentication code according to a linear folding algorithm for a reflected version of g.

\* \* \* \* \*